United States Patent
Ylonen

(10) Patent No.: US 8,527,559 B2
(45) Date of Patent: Sep. 3, 2013

(54) GARBAGE COLLECTOR WITH CONCURRENT FLIPPING WITHOUT READ BARRIER AND WITHOUT VERIFYING COPYING

(75) Inventor: Tatu J. Ylonen, Espoo (FI)

(73) Assignee: Clausal Computing Oy (FI)

( * ) Notice: Subject to any disclaimer, the term of this patent is extended or adjusted under 35 U.S.C. 154(b) by 224 days.

(21) Appl. No.: 13/111,830

(22) Filed: May 19, 2011

(65) Prior Publication Data

US 2011/0264713 A1    Oct. 27, 2011

Related U.S. Application Data

(63) Continuation-in-part of application No. 13/090,643, filed on Apr. 20, 2011.

(60) Provisional application No. 61/346,594, filed on May 20, 2010, provisional application No. 61/327,374, filed on Apr. 23, 2010.

(51) Int. Cl.
*G06F 12/00* (2006.01)
*G06F 17/30* (2006.01)

(52) U.S. Cl.
USPC ............................................ 707/813; 707/818

(58) Field of Classification Search
USPC .................................................. 707/813–820
See application file for complete search history.

(56) References Cited

U.S. PATENT DOCUMENTS

| | | | | |
|---|---|---|---|---|
| 5,873,105 | A * | 2/1999 | Tremblay et al. | 707/999.206 |
| 7,814,488 | B1 * | 10/2010 | Dice et al. | 707/704 |
| 8,166,276 | B2 * | 4/2012 | Serebrin | 711/203 |

* cited by examiner

*Primary Examiner* — Vincent F Boccio

(57) ABSTRACT

In an object-relocating garbage collector, objects are copied and new copies taken into use concurrently with mutator execution without needing to use a read barrier, and importantly, without requiring verification (read-back) of each copied word and without requiring atomic instructions for the copying. Write barriers, thread-local write barrier buffers and processing them by the garbage collector, and write propagation are used for achieving this.

16 Claims, 10 Drawing Sheets

GARBAGE COLLECTOR WITH CONCURRENT FLIPPING WITHOUT READ BARRIER AND WITHOUT VERIFYING COPYING

CROSS-REFERENCE TO RELATED APPLICATIONS

This application is a non-provisional application of U.S. provisional application 61/346,594, filed May 20, 2010 (pending). This application is a continuation-in-part of U.S. patent application Ser. No. 13/090,643, filed Apr. 20, 2011 (pending), which is a non-provisional application of U.S. provisional application 61/327,374, filed Apr. 23, 2010. These prior applications are all hereby incorporated herein by reference.

INCORPORATION-BY-REFERENCE OF MATERIAL SUBMITTED ON ATTACHED MEDIA

Not Applicable

TECHNICAL FIELD

The present invention relates to memory management in computing systems, particularly garbage collection. It is also relevant, among other things, for object-oriented databases and distributed systems.

BACKGROUND OF THE INVENTION

Many garbage copying garbage collectors use short evacuation pauses to perform garbage collection (often using independently collectable regions to make the collection incremental). An example of a modern region-based incremental collector using stop-the-world evacuation pauses is illustrated in D. Detlefs et al: Garbage-First Garbage Collection, ISMM'04, pp. 37-48, ACM, 2004, which is hereby incorporated herein by reference.

In many applications it is desirable to obtain even shorter pause times, or to eliminate stop-the-world pauses altogether. F. Pizlo et al: STOPLESS: A Real-Time Garbage Collector for Multiprocessors, ISMM'07, pp. 159-172, ACM, 2007, which is hereby incorporated herein by reference, describes a garbage collector for real-time applications with very short pause times, implemented using soft synchronization and using wide objects for copying. It uses a read barrier to coordinate access to old and new copies of objects. Various other modern concurrent real-time garbage collectors are described in F. Pizlo et al: A Study of Concurrent Real-Time Garbage Collectors, PLDI'08, pp. 33-44, ACM, 2008, which is hereby incorporated herein by reference.

Various alternative approaches to copying objects in real-time collectors are presented in the following patent application publications, which are hereby incorporated herein by reference:

U.S. 2008/0281886 A1 (Petrank et al), Nov. 13, 2008, "Concurrent, lock-free object copying" describes, among other things, a relocating mechanism that moves an object by using a status field related to a data field, possibly in an interim (wide) object space, which is then copied to a to-space object.

U.S. 2009/0222494 A1 (Pizlo et al), Sep. 3, 2009, "Optimistic object relocation" describes, among other things, a technique wherein memory accesses are monitored for a write to an object [that is being relocated], and if a write is detected during relocation, the relocation fails and the memory at the destination address is deallocated; but if no write is detected, the relocation succeeds and the references are updated to point to the destination address. The aborted relocation may then be retried (to a newly allocated destination address).

U.S. 2009/0222634 A1 (Pizlo et al), Sep. 3, 2009, "Probabilistic object relocation" describes, among other things, a method of relocating objects where the object relocation may mark the words of the object during relocation with a relocation value to indicate transfer to the destination memory without locking the threads. The threads may be configured to check the value in the source memory during object access, and to access the corresponding word of the destination memory if the source memory word comprises the relocation value.

U.S. Pat. No. 6,671,707 (Hudson et al), Dec. 30, 2003 (Method for practical concurrent copying garbage collection offering minimal thread block times), which is hereby incorporated herein by reference, teaches a method for concurrent copying garbage collection offering minimal thread blocking times without the use of read barriers. In their method, mutators may access and modify both the old and new copy of a modified object simultaneously, and a special write barrier is used for propagating writes from one copy to the other. In at least one embodiment, they use an atomic compare-and-swap instruction for installing a forwarding pointer in a copied object. Their object copying operation (FIG. 4E) verifies copying of every word by reading back the written value and comparing it against the written value, and sometimes uses an atomic instruction for copying a word, which is a significant overhead over standard copying (a compare-and-swap instruction can cost up to about a hundred times the processing time and memory bandwidth of a normal pipelined burst-mode memory write). A related academic paper is R. Hudson and J. E. B. Moss: Sapphire: Copying GC Without Stopping the World, JAVA Grande/ISCOPE'01, pp. 48-57, ACM, 2001, which is hereby incorporated herein by reference.

The Hudson&Moss method has been further developed in T. Kalibera: Replicating Real-Time Garbage Collector for Java, JTRES'09, pp. 100-109, ACM, September 2009, which is hereby incorporated herein by reference.

A recent survey on reorganizing data structures, including a section related to garbage collection (especially as it relates to persistent object systems), is provided in G. Sockut et al: Online Reorganization of Databases, ACM Computing Surveys, 41(3), pp. 14:1-14:136, 2009, which is hereby incorporated herein by reference.

Surveys of distributed garbage collection algorithms can be found in S. Abdullahi et al: Garbage Collecting the Internet: A Survey of Distributed Garbage Collection, ACM Computing Surveys, 30(3):330-373, 1998 and S. Brunthaler: Distributed Garbage Collection Algorithms, Seminar Garbage Collection, Institute for System software, January 2006. The references contained therein provide extensive information on general implementation techniques for distributed garbage collection.

Distributed shared memory refers to systems where several computers that do not have hardware shared memory share a single address space accessible to software running on each of the nodes. In effect, it creates an illusion of a shared memory for application programs. Extensive research on distributed shared memory took place in the 1990's. Some references include:

M. Shapiro and P. Ferreira: Larchant-RDOSS: a Distributed Shared Persistent Memory and its Garbage Collector, WDAG'95 (9th International Workshop on Distributed Algorithms), pp. 198-214, Lecture Notes in Computer Science 972, Springer, 1995

J. Protic et al: A Survey of Distributed Shared Memory Systems, 28th Hawaii International Conference on System Sciences (HICSS'95), pp. 74-84, 1995

R. Kordale et al: Distributed/concurrent garbage collection in distributed shared memory systems, 3rd International Workshop on Object Orientation in Operating Systems, pp. 51-60, IEEE, 1993.

Distributed shared memory may allow migration or replication of objects to several nodes, and some distributed shared memory systems implement fine-grained synchronization of updates (frequently in connection with the implementation of distributed mutual exclusion algorithms and/or distributed memory barrier operations).

Known concurrent garbage collectors generally require using either a read barrier during object relocation, or verifying each word copy, or using atomic instructions for copying. Since reads are much more frequent in applications than writes, using a read barrier imposes a significant overhead on applications. Avoiding atomic instructions may yield significant performance improvements. Synchronization between a write barrier and a read barrier can also be very difficult to implement efficiently in a distributed environment.

BRIEF SUMMARY OF THE INVENTION

XXX Aspects

Benefits of the present invention include, but are not limited to:
- speeding up copying: standard memcpy (memory copy function) copying can be used, which can be many times faster than copying involving verification of each copied word and potentially tens of times faster than copying involving atomic instructions (copying performance is important, because it is a major component of garbage collection overhead on applications and power consumption in mobile devices); and
- eliminate tight coupling in copying between mutators and the garbage collector, enabling use in distributed garbage collectors—there is no known way to perform the verification efficiently in a distributed shared memory system, whereas some of the methods presented herein can be used in a distributed system as they use much looser coupling, and the propagation may be piggy-packed on distributed mutual exclusion operations.

The scope of the invention is not, however, intended to be limited to embodiments that solve any or all of the above mentioned benefits.

BRIEF DESCRIPTION OF THE SEVERAL VIEWS OF THE DRAWING(S)

Various embodiments of the invention are illustrated by the accompanied figures.

DETAILED DESCRIPTION OF THE INVENTION

Figure 1:
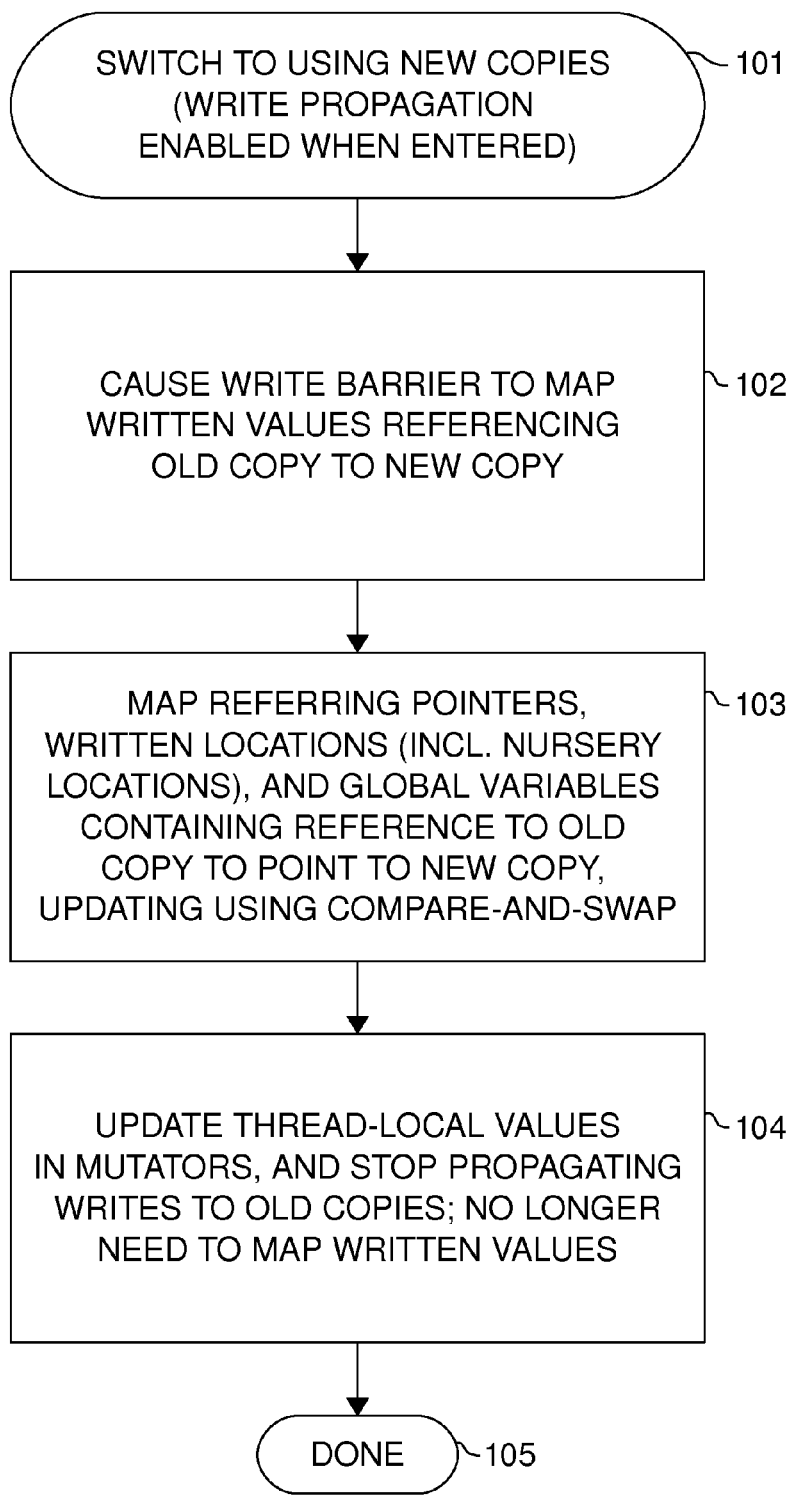
FIG. 1 illustrates updating pointers referring to objects being relocated to refer to the new copies of such objects concurrently with mutator execution without requiring the use of a read barrier in an embodiment.

FIG. 1 illustrates updating pointers referring to objects being relocated to refer to the new copies of such objects concurrently with mutator execution without requiring the use of a read barrier in an embodiment of the invention. Switching to using the new copies begins at 101, with write propagation enabled when entered. Write propagation means that any write to an old copy of a relocated object is propagated to the corresponding field in the new copy of the object (with the value mapped to point to the corresponding new copy, if it points to an old copy of a relocated object), and any write to a new copy of a relocated object is propagated to the corresponding field in the old copy of the object (with the value mapped to point to the corresponding old copy, if it points to a new copy of a relocated object). Write propagation is illustrated in more detail in FIG. 3. Usually a write barrier would also track which memory locations have been written since the last remembered set update.

Figure 6:
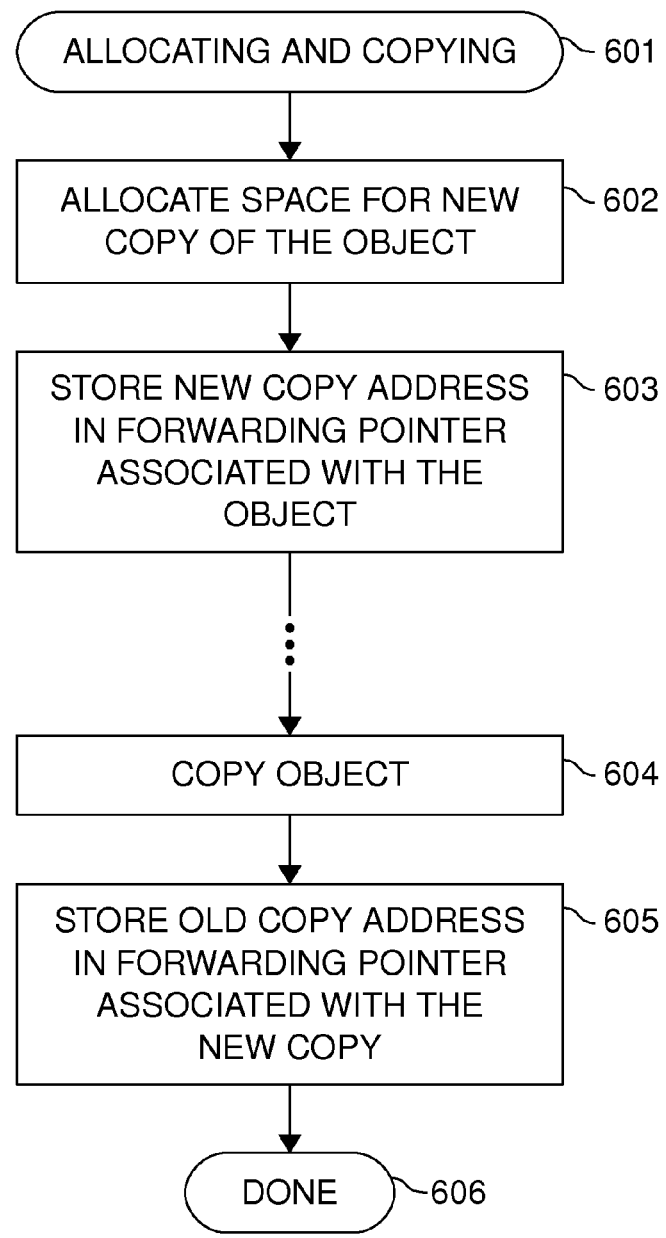
FIG. 6 illustrates allocating space for the new copy of an object to relocate, copying it, and maintaining forwarding pointer(s) in an embodiment.

The original object to be relocated will be called the old copy. The term new copy will be used for a copy of the original object at the location to which it is relocated (the location is often allocated during the relocation, as illustrated in FIG. 6). The new copy and the old copy of the same object are said to correspond to each other; they are not considered separate objects, but rather different instances of the same object, and to applications (mutators) they look and behave like the same object in many embodiments (in some embodiments, however, a pointer-equal test might distinguish them).

In most embodiments only objects being relocated have both new and old copies. An object being relocated means an object that is currently in the process of being relocated; relocation usually comprises allocating space for a new copy, copying the old copy to the space allocated for the new copy to construct the new copy, updating pointers that refer to the old copy to refer to the new copy, and finally freeing the old copy (however, it becomes more complicated if there are mutators executing concurrently). This disclosure mostly focuses on updating the referring pointers during relocation, but some aspects of the invention may also have more general applicability.

Updating referring pointers means that those pointers accessible to mutators that refer to the old copies of objects being relocated are changed to refer to the corresponding new copies. Another term meaning roughly the same is switching to use the new copies, though this is perhaps more general (allowing, e.g., switching by causing a read barrier to map from old copies to new copies).

In some embodiments, particularly distributed shared memory systems supporting replication, there could be more than one instance of the old copy, but they are treated as one for the description herein. Likewise, in some embodiments there could be more than one instance of the new copy of the same object, e.g., in distributed shared memory systems where the new copy is immediately migrated to multiple nodes (or all nodes); however, they, too, will be treated as one to simplify the description. One way to generalize the method to embodiments with such multiple instances of the old copy and/or the new copy is to write to all instances and read from any instance in each case (performing reads/writes using messages or RPC when appropriate).

Figure 2:
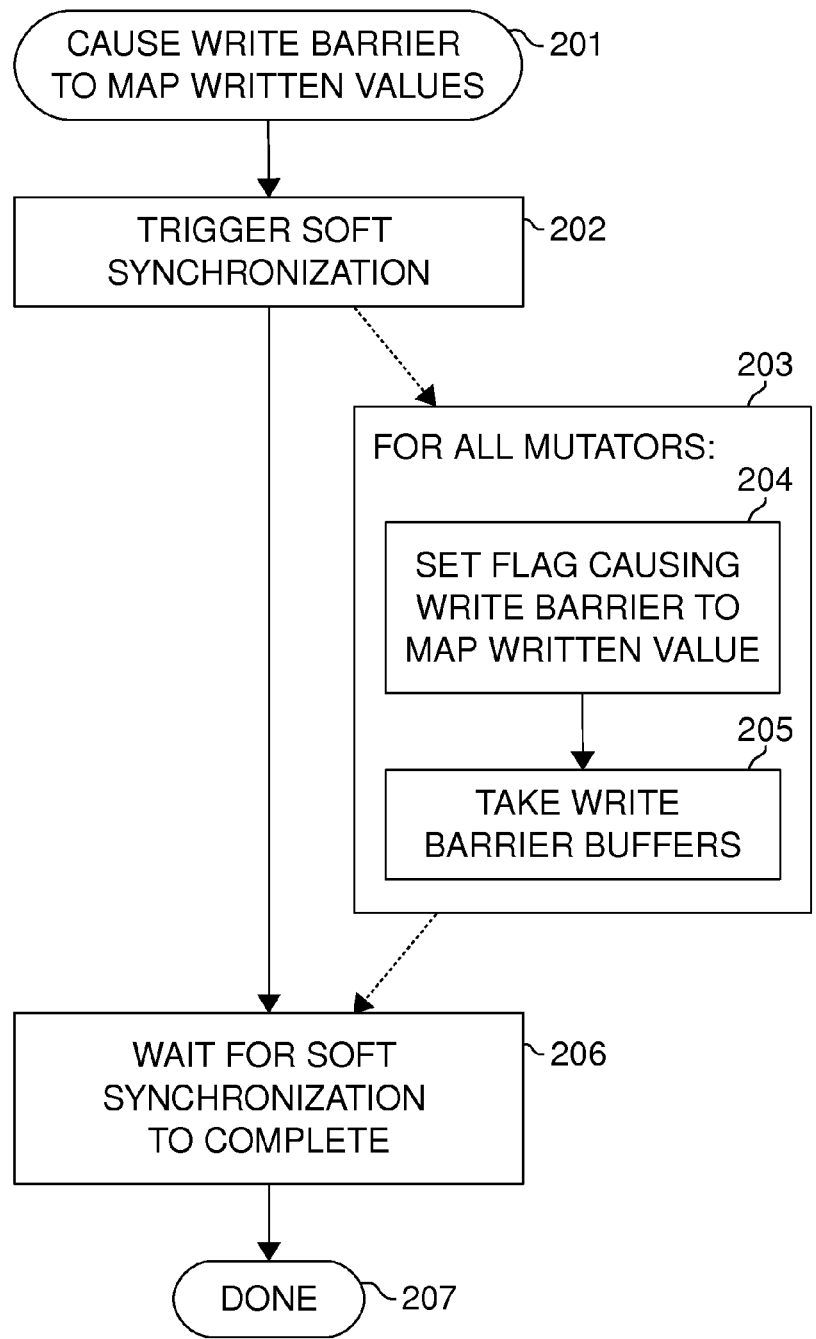
FIG. 2 illustrates causing the write barrier to map written values that point to the old copies to point to the corresponding new copies in an embodiment.
Figure 3:
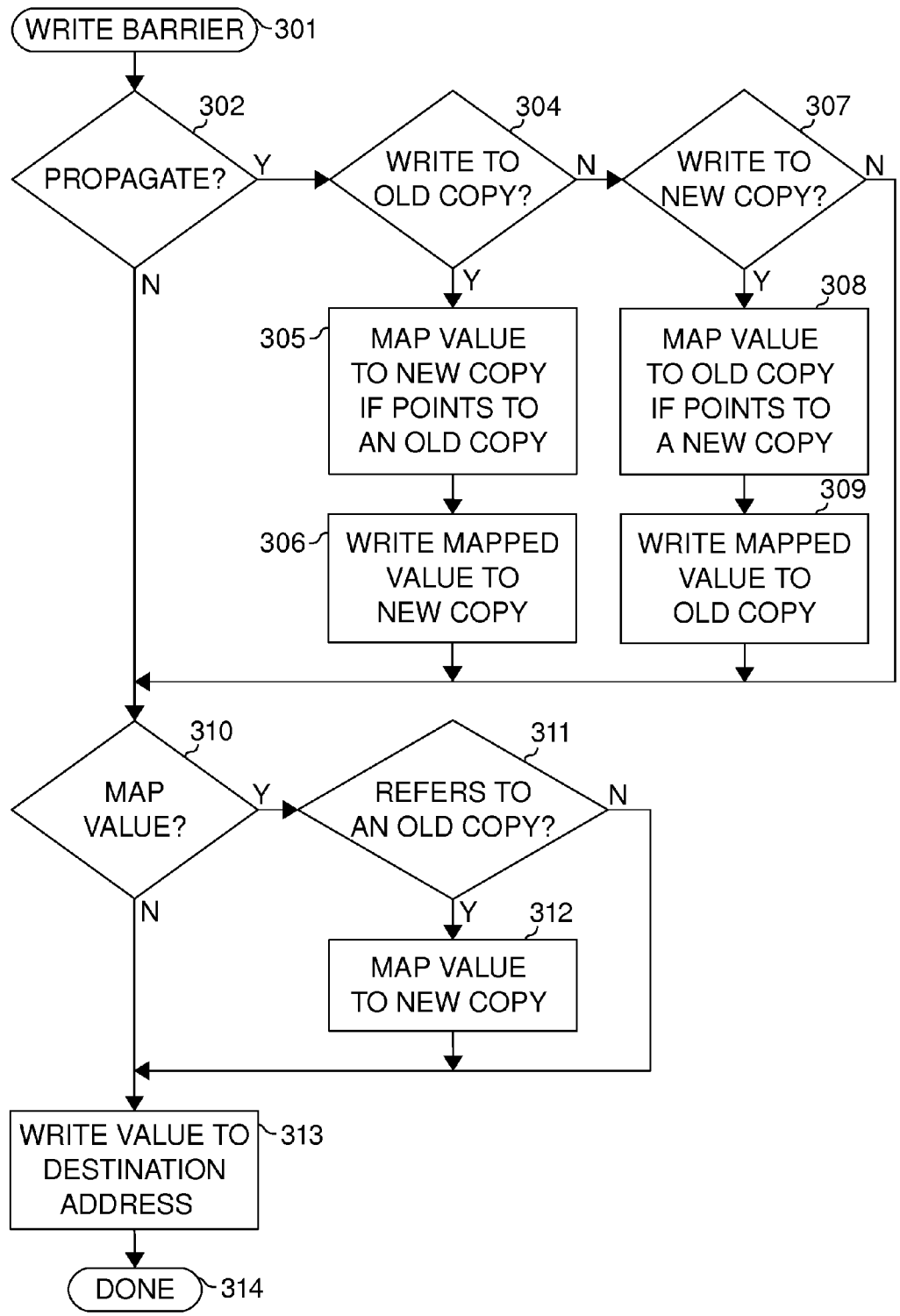
FIG. 3 illustrates a write barrier in an embodiment.

Step 102 causes a write barrier to map written values referencing an old copy of a relocated object to a reference to the corresponding new copy. A possible implementation of this step is illustrated in FIG. 2. A possible implementation of a write barrier is illustrated in FIG. 3.

Here, "written value" means the new value that is (requested to be) written to the written memory location. In some cases the value may be mapped to a different value before actually being stored, as described below.

Mapping a pointer to an old copy of an object to a pointer to the corresponding new copy means looking up or calculating a pointer that points to the new copy, usually using some kind of look-up or mapping mechanism as they are known in the art, for example by reading a forwarding pointer, indexing a table, or looking up the value from a hash table. (And similarly for mapping a pointer to a new copy to a pointer to the corresponding old copy.) Sometimes the term may also imply changing the value containing the value being mapped to the result of the mapping.

Figure 4:
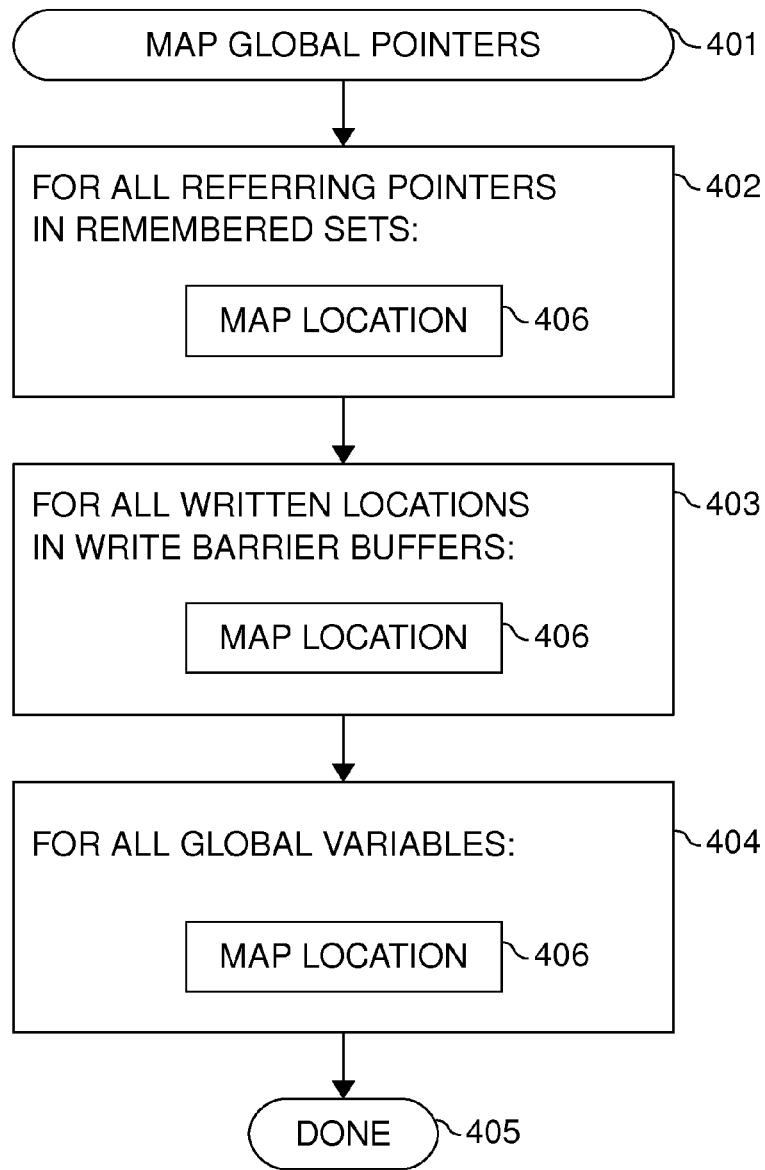
FIG. 4 illustrates updating global memory locations potentially referring to a relocated object in an embodiment.

Step 103 maps global referring pointers (usually those monitored using a write barrier, as opposed to thread-local pointers in, e.g., registers and stack) that refer to the old copies of the relocated objects to refer to the corresponding new copies. This also maps any memory locations that may have been written since the remembered sets (or whatever is used to find the referring pointers) were last updated (the write barrier would typically be used to track written locations, as described in more detail in patent application Ser. No. 12/772,496, which is hereby incorporated herein by reference). After mapping, the location containing the pointer is updated using an atomic compare-and-swap, a load-linked store-conditional pair, or some other mechanism known in the art for updating the value of the location only if it has not been changed by another thread/processor after it was read. A possible implementation of this step is illustrated in FIG. 4.

Figure 9:
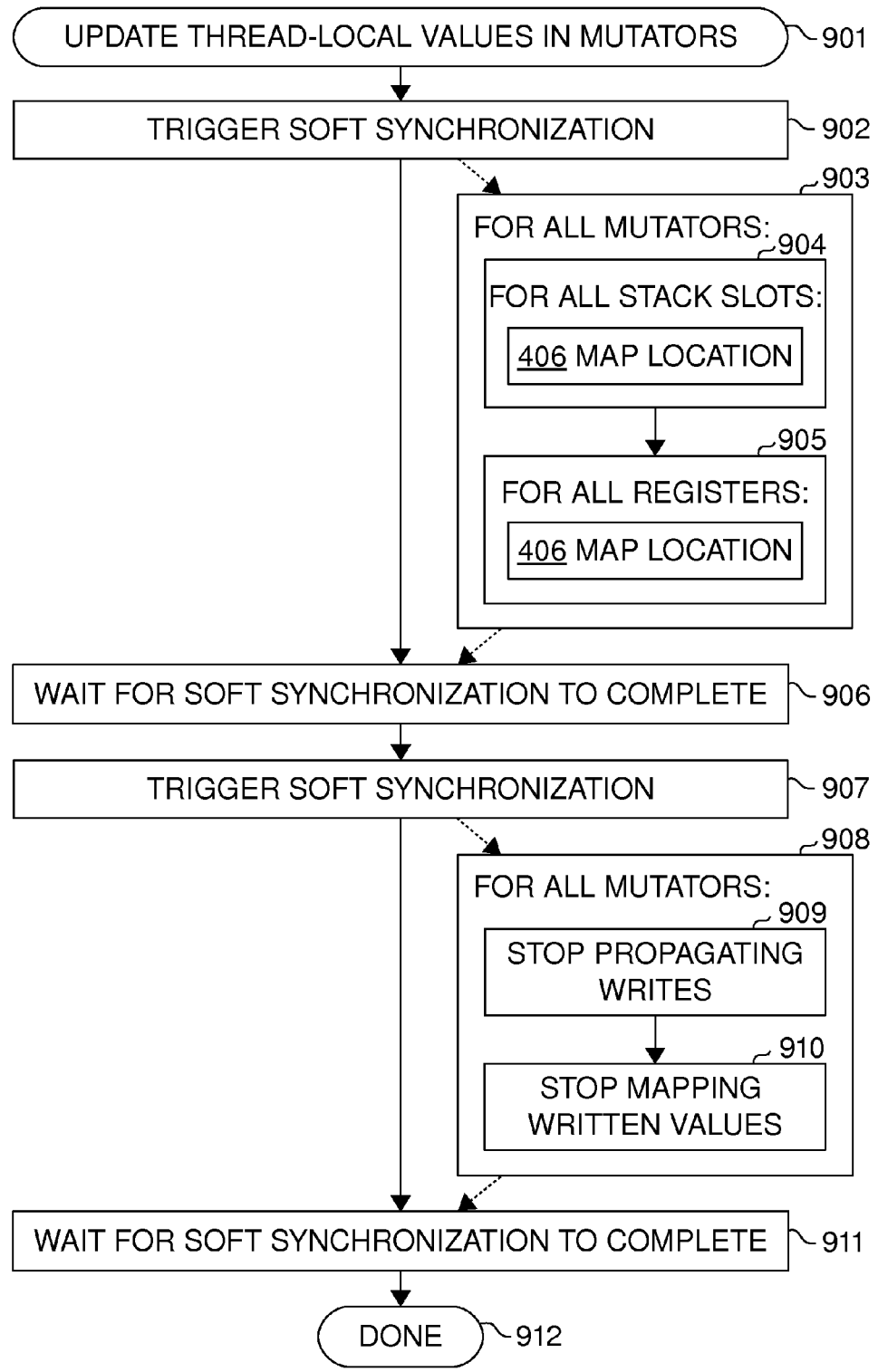
FIG. 9 illustrates updating thread-local values in mutators in an embodiment.

Step 104 updates thread-local locations in mutators, and stops propagating writes to old copies. There is also no need to map written values for threads after they have updated their thread-local values. A possible implementation is illustrated in FIG. 9.

Switching to using the new copies is complete at 105, after which the old copies may be freed.

FIG. 2 illustrates causing the write barrier to map written values that point to the old copies to point to the corresponding new copies in an embodiment. The operation starts at 201. 202 triggers soft synchronization (e.g., by setting a flag in each mutator thread that is tested at each GC point). 203 illustrates actions performed by each mutator during soft synchronization (not necessarily simultaneously by all mutators). 204 sets a flag (each thread may have its own flag, or a global flag may be used together with appropriate synchronization). 205 takes write barrier buffers from the thread (e.g., adding the write barrier buffers to a list; see the referenced U.S. patent application Ser. No. 12/772,496 for more details). The taken write barrier buffers are used for detecting which memory locations have been written before mapping the written value was enabled but after the last remembered set update. (Other ways of obtaining such information may also be used, and in some embodiments a remembered set update could be performed here, implying there are no such writes and permitting the elimination of steps related to updating written locations in the flowcharts).

Step 206 waits for all mutators to complete soft synchronization (for threads in blocking calls, steps 204 and 205 may be performed by any thread, such as the thread initiating the soft synchronization). 207 completes causing the write barrier to map written values.

FIG. 3 illustrates the implementation of a write barrier in an embodiment (the implementation is often divided into a fast path component generated by the compiler at each site where a write barrier is emitted, and a slow path implemented as a function that is invoked by the fast path when something actually needs to be done). In some embodiments the fast path (or both) could be implemented in hardware. There are often also other operations performed by the write barrier besides those illustrated here, as is known in the art and depending on the particular garbage collection method used.

Various filtering criteria are normally used by the write barrier (fast path) to reduce the number of writes that are processed by the write barrier. Nevertheless, propagating writes should still be performed for writes to objects being relocated and the written values mapped in most embodiments. Also, in most embodiments the write barrier would track which locations (usually at least outside the objects being relocated) have been written into since the remembered sets were last updated (usually at least if the new value points to a new copy of an object being relocated). In some embodiments this might also include writes to new objects created after the remembered sets were last updated. The implementation of write barriers in one embodiment is discussed in more detail in the co-owned U.S. patent application Ser. No. 12/758,068 "Thread-local hash table based write barrier buffers", which is hereby incorporated herein by reference.

The write barrier is entered at 301. 302 checks whether propagating writes is enabled (indicated by, e.g., a thread-local flag). 304 checks if the write is to an old copy of a relocated object, and if so, 305 checks if the written new value points to an old copy of a relocated object and maps it to the corresponding new copy if so (see FIG. 7; it may be implemented as a test and a multiplexer in hardware or software), and 306 writes the (mapped) value to the new copy corresponding to the written old copy (to the same offset within the object to which it is being written in the old copy). Analogously, 307 checks if the write is to a new copy of a relocated object, and if so, 308 checks if the written new value points to a new copy of a relocated object and maps it to the corresponding old copy if so (see FIG. 8), and 309 writes the (mapped) value to the old copy corresponding to the written new copy (to the same offset).

Checking whether a pointer is to an old copy or a new copy of a relocated object may be performed in a variety of ways, including, for example, comparing address ranges and/or testing a region status array, as described in the referenced U.S. patent application Ser. No. 12/772,496. Tag bits could also be tested to check if the value is a pointer.

Step 310 checks whether the written new value should be mapped from an old object to a new object (cf. 204). If so, 311 checks whether the new value refers to an old copy of an object being relocated, and if so, 312 maps the new value to refer to the corresponding new copy (see FIG. 7).

Step 313 stores the (mapped) new value at the written memory address (the original destination address of the write), and 314 completes the write barrier.

FIG. 4 illustrates updating global memory locations (as opposed to thread-local memory locations) containing pointers to a relocated object in an embodiment. 401 begins the operation. 402 maps the contents of the memory location for all referring pointers (i.e., the memory location containing a pointer to a relocated object; typically this would iterate over remembered sets for the regions from/to which objects are being relocated, as is known in the art). 403 maps the contents of all memory locations written since remembered sets were last updated but before mapping the written value was enabled (typically it would iterate over writes in the write barrier buffers taken at 205; see U.S. Ser. No. 12/772,496 for a more detailed description). 404 maps all global variables (if not already included in remembered sets; note that it is assumed in this description that writes to global variables are monitored using a write barrier for mapping the written value). 405 completes the operation. 406 illustrates mapping the contents of a memory location (see FIG. 5).

Memory locations found from remembered sets or write barrier buffers residing within the objects being relocated are preferably not updated at this stage, and have instead been updated when the objects were copied. However, in some embodiments some or all such pointers might not be updated until at this stage.

Normally only mutator-accessible global memory locations are updated. There may be other memory locations that are not (directly) accessible to the mutators that are not updated. For example, there could be a data structure listing the objects being relocated, so that their old copies can be freed after the relocation is complete, and pointers in such a data structure would probably not be accessible to mutators and would normally not be mapped. Likewise, the "back pointers" (see below) would normally not be mapped.

Figure 5:
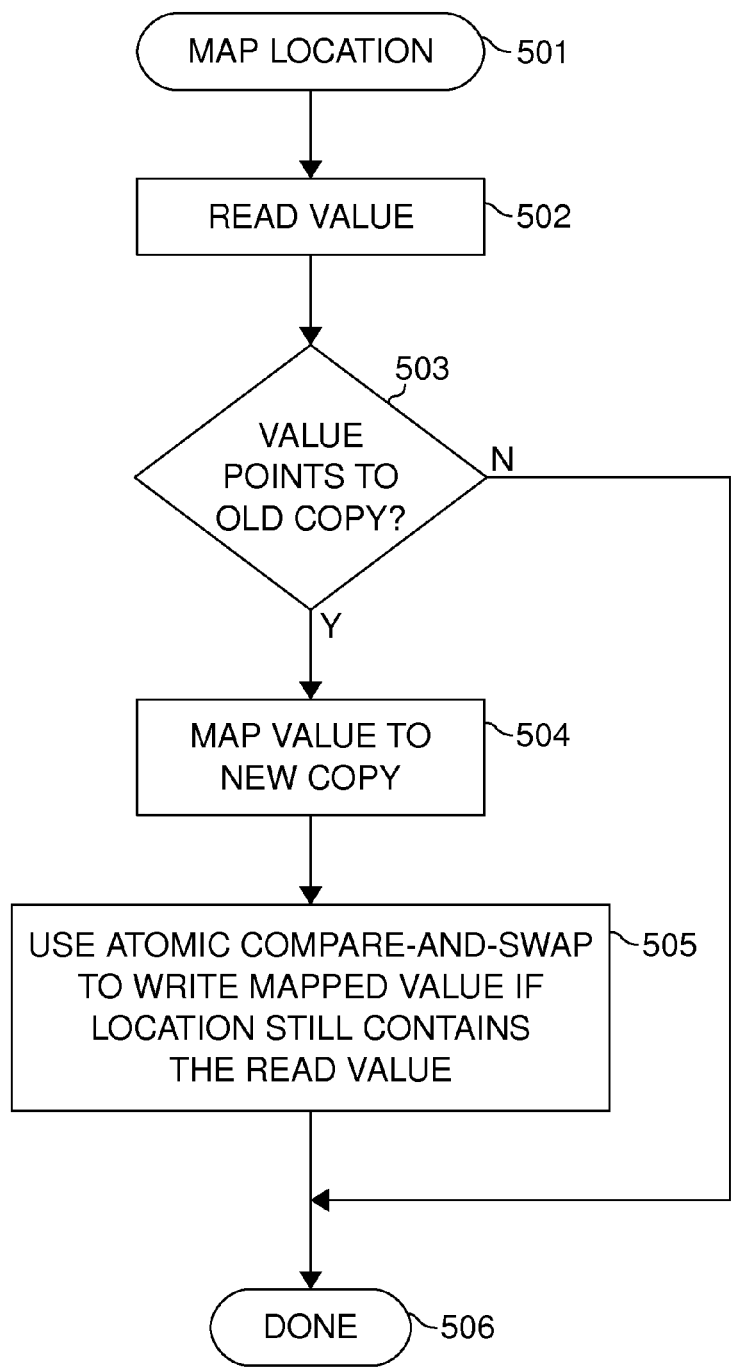
FIG. 5 illustrates updating the value of a location in an embodiment.

FIG. 5 illustrates updating the value in a memory location in an embodiment. Basically, if the memory location contains a pointer to an old copy of an object being relocated, it is changed to point to the corresponding new copy. Since mutators may write to the memory location between reading and writing it, the write is performed using an atomic compare-and-swap operation (or equivalent) to ensure a new value written by a mutator is not accidentally overwritten. This forms a connection between mapping a memory location and the write barrier(s) in mutators.

The operation begins at 501. The original value of the memory location is read at 502. 503 checks if the value points to an old copy of a relocated object, and if so, 504 maps the read value to the corresponding new copy (see FIG. 7), and 505 writes the mapped value to the memory location if it still contains the read value (using, e.g., a compare-and-swap instruction or a load-linked store-conditional pair). 506 completes the operation.

FIG. 6 illustrates allocating space for the new copy of an object to relocate, copying it, and maintaining forwarding pointer(s) in an embodiment. 601 begins the sequence. 602 allocates space for a new copy of the object, 603 stores a pointer to the new copy in a forwarding pointer associated with the object, 604 copies the object to the address of the new copy, and 605 stores the address of the old copy in a forwarding pointer associated with the new copy, and 606 completes the operation.

A forwarding pointer could be, for example, a field (not visible to mutators) in an object's header, or it might be stored separately, for example, in an array associated with the region where the particular copy is stored (see U.S. Ser. No. 12/772, 496 for a discussion of some alternatives). Alternatively, various other types of copy locator data structures could also be used (e.g., hash tables).

An unusual feature in the embodiment illustrated in FIG. 6 (and FIG. 8) is that a forwarding pointer associated with the new copy is used for providing a "back pointer" from the new copy to the old copy. An advantage of the back pointer is that it provides a very fast means for mapping pointers to a new copy to pointers to the old copy for copy propagation purposes.

Figure 7:
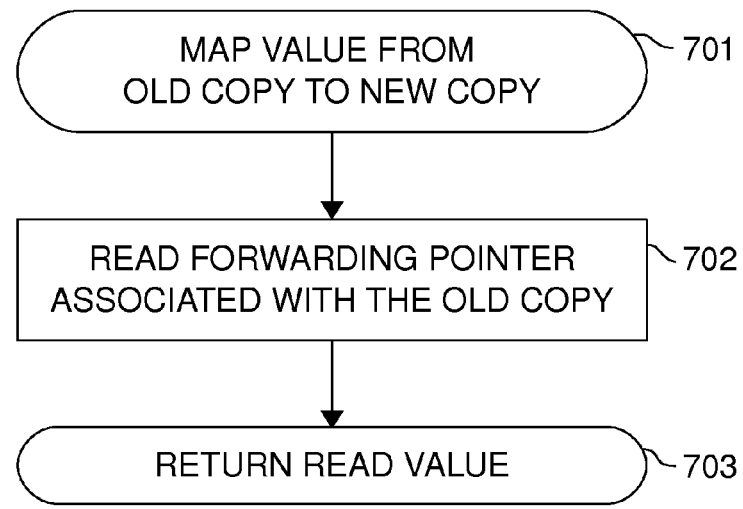
FIG. 7 illustrates mapping a value referring to an old copy to refer to the corresponding new copy using forwarding pointer(s) in an embodiment.

FIG. 7 illustrates mapping a pointer to an old copy to a pointer to the corresponding new copy using forwarding pointer(s) in an embodiment. 701 begins the operation. 702 reads the forwarding pointer associated with the old copy. 703 returns the read value. In another embodiment, mapping from the old copy to a new copy could look up a forwarding pointer data structure associated with the region in which the old copy is stored, look up the forwarding pointer corresponding to the object from the data structure (e.g., based on the offset of the object in its region) (possibly expanding the value in the data structure to a normal pointer if it is in compressed form), and returning the pointer. The data structure could be, e.g., an array indexed by the offset of an object in the region divided by the minimum alignment of an object.

Figure 8:
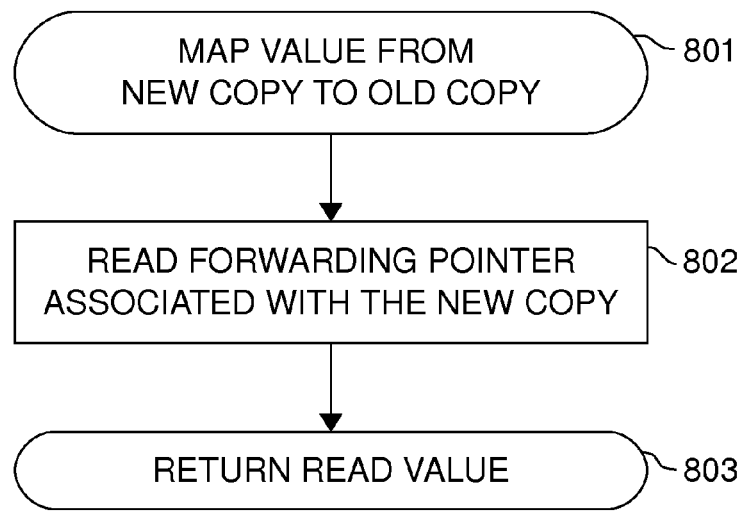
FIG. 8 illustrates mapping a value referring to a new copy to refer to the corresponding old copy using forwarding pointer(s) in an embodiment.

FIG. 8 illustrates mapping a pointer to a new copy to a pointer to the corresponding old copy using forwarding pointer(s) in an embodiment. It is analogous to mapping from the old copy to the new copy, but uses the back pointer (which may be stored in the same slot used for the forwarding pointer, just in a different object). 801 begins the operation, 802 reads the forwarding pointer associated with the new copy (which is actually the back pointer), and 803 completes the operation.

FIG. 9 illustrates updating thread-local values in mutators in an embodiment. The operation begins at 901. At that point, all global values have already been updated to point only to new copies (because all global locations that may contain pointers to the objects being relocated were updated, and mapping written values prevented new pointers to old copies from being stored in global locations even if mutators still had old values in their thread-local data). 902 triggers soft synchronization. 903 illustrates operations performed by each mutator (or on their behalf if they are in blocking calls) during the soft synchronization. 904 updates all stack locations on the stack (that might contain pointers to the objects being relocated—e.g., type constraints might help avoid checking some locations). 905 updates all registers or other analogous values (e.g., local variables in the current stack frame if not handled in 904). 906 waits until 903 has been performed for all mutators.

Then, since all mutators and global data now only reference the new copies (there are no more references to the old copies), it is possible to stop propagating writes. This could not be done yet at 903, because some mutators could still have been reading the old copies. One option is to perform another soft synchronization to stop propagating. 907 triggers the soft synchronization; 908 illustrates operations performed by (or on behalf of) mutators; 909 stops propagating writes; 910 stops mapping written values by the current mutator (this could also be done in 903); and 911 waits until the soft synchronization is complete. Updating thread-local values is complete at 912.

Clearly it would be possible to implement updating thread-local stack slots and stopping propagating writes and stopping mapping written values as separate steps or subcomponents.

Figure 10:
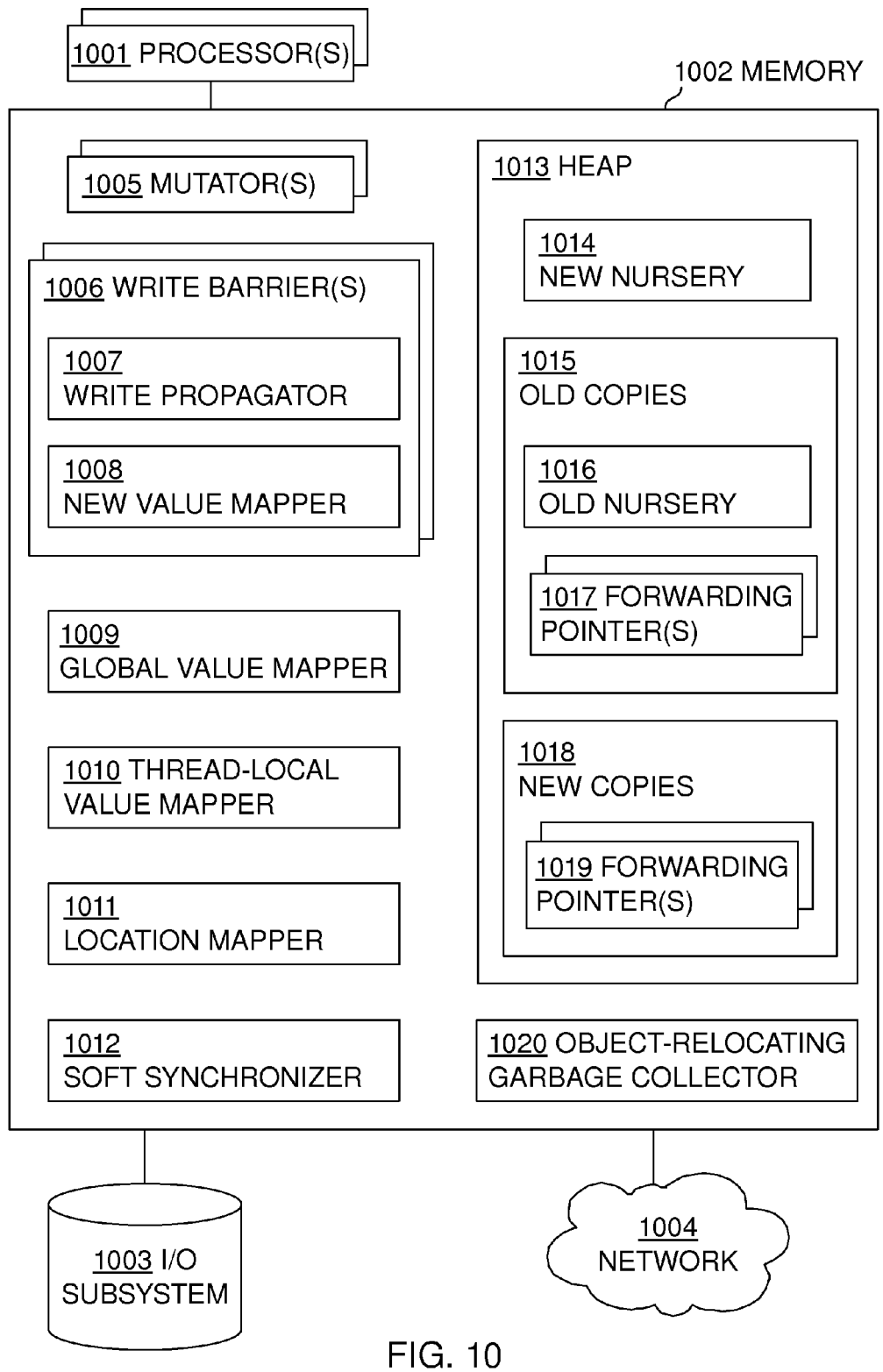
FIG. 10 illustrates an apparatus embodiment and a computer control logic embodiment stored in the memory of an apparatus.

FIG. 10 illustrates an apparatus embodiment and a computer control logic embodiment stored in computer-readable memory in an apparatus. 1001 illustrates one or more processors (physical processors, processor cores and/or special processing units), 1002 illustrates the main memory (usually fast random-access non-volatile memory, but other technologies (including non-volatile memories such as memristors) are also possible, and in a computer control logic embodiment this may represent any computer-readable medium), 1003 illustrates an I/O subsystem (typically comprising non-volatile storage and other I/O devices and auxiliary components known in the art), and 1004 illustrates a network and interfaces thereto. The apparatus may also be a clustered computing system, comprising several computing nodes, each similar to that shown in FIG. 10, connected together by the network 1004 (which may also comprise a connection to, e.g., the Internet). The network may use any known network technologies, such as InfiniBand, 10 GigE, Ethernet, and/or various wireless networks.

The methods presented herein may be useful for implementing more responsive garbage collection in very large knowledge processing systems (including semantic search systems), social networking systems, intelligent robots, intelligent vehicles, intelligent appliances, and many other kinds of apparatuses. Such apparatuses may also contain various other components not shown in the figure, such as sensors, cameras, radar, ultrasound sensors, manipulators, wheels, hands, legs, wings, rotors, joints, motors, engines, conveyors, control systems, drive trains, propulsion systems, enclosures, support structures, hulls, fuselages, power sources, batteries, light sources, instrument panels, graphics processors, front-end computers, tuners, radios, infrared interfaces, remote controls, circuit boards, connectors, cabling, etc. Various examples illustrating the components that typically go in each kind of apparatus can be found in US patents as well as in the open technical literature in the related fields, and are generally known to one skilled in the art or easily found out from public sources. Various embodiments of the invention can generally lead to improved responsiveness, more attractive user interaction, better scalability, improved reliability, more intelligence, and improved competitiveness in a broad variety of apparatuses and systems, without requiring substantial changes in components other than the higher-level control/interface systems that perform data processing.

The apparatus comprises one or more mutators 1005; in many embodiments they are implemented using threads (e.g., operating system threads or threads in virtual machines, possibly involving interpretation, emulation, or just-in-time compilation). Mutators may also have additional context besides a normal thread context (e.g., flags indicating whether write propagation is enabled and whether written values should be mapped).

The apparatus also comprises one or more write barriers 1006, each of which may comprise a write propagator 1007 (which implements roughly the functionality implemented by steps 302 to 309 in FIG. 3) and/or a new value mapper 1008 (which implements roughly the functionality implemented by steps 310 to 312 in FIG. 3).

The apparatus also comprises a global value mapper 1009 (implementing functionality similar to that illustrated in FIG. 4), a thread-local value mapper 1010 (implementing functionality similar to that illustrated in FIG. 9), a location mapper 1011 (implementing functionality similar to that illustrated in FIG. 5), and a soft synchronizer 1012 (implementing soft synchronization functionality). In one embodiment these components are parts of a computer control logic stored in tangible computer-readable memory 1002, which in such embodiments might not include any processors, I/O subsystems, or networks (or some of the other illustrated components). In another embodiment these components are part of a computer control logic implemented as part of an ASIC, system-on-a-chip, or other hardware module. In yet another embodiment the computer control logic comprises configuration data for an FPGA stored on an FPGA-readable medium (here considered to be a computer-readable medium, even though an FPGA is not necessarily a general purpose computer, and an FPGA will be considered a processor herein, even though not all FPGAs contain a general purpose processor). It is known in the art how to implement flow charts and state machines as digital logic, using FPGAs, or as executable instructions for a processor.

The heap 1013 represents a work memory area used for storing objects (including the nursery 1014 for newly allocated objects, old copies 1015 of objects being relocated, the old copies often including live objects from an old nursery 1016, and one or more forwarding pointers 1017 for the objects being relocated). It also comprises the new copies 1018 and forwarding pointers (actually, back pointers) 1019 for them. The different areas of the heap are not necessarily all of the same kind of memory, and parts of them might be on different nodes in a distributed system or even in non-volatile storage (e.g., disk), accessible only using, e.g., messages (e.g., RPC or a distributed shared memory implementation).

The object-relocating garbage collector 1020 illustrates a garbage collector that may relocate objects, such as a copying or a compacting garbage collector. The write barrier would typically be connected to the garbage collector (e.g., tracking which memory locations have been written into since the garbage collector last performed certain operations). Object relocation, including the operations performed by the global value mapper 1009, thread-local value mapper 1010, location mapper 1011, and/or soft synchronizer 1012 would often be implemented as part of the garbage collector. However, not all embodiments necessarily have a garbage collector.

When used in a programming environment that supports a pointer-equal operation (e.g., Lisp's "EQ"), such pointer-equal operation may be augmented to treat the new copy and the old copy of an object the same. For example, a global (or thread-local) flag 'switching_to_new_copies' could indicate that switching to new copies of objects being relocated is in progress, and code similar to the following could be used for implementing a pointer-equal comparison (in C):

```
ptrequal = x == y ||
    (switching_to_new_copies &&
    POINTERP(x) && BEING_RELOCATED (x) &&
    FORWARDING_PTR(x) == y);
```

Here, POINTERP returns true if the argument is a pointer (e.g., based on tag bits), BEING_RELOCATED returns true if the argument is an object being relocated (which implies it has an old and a new copy at when 'switching_to_new_copies' is true), and FORWARDING_PTR returns the forwarding pointer of the object (from either the old or the new copy; for the new copy it is really the back pointer). Naturally, the code could be divided to a fast path and a slow path that would be invoked when 'switching_to_new_copies' is true. In another embodiment 'switching_to_new_copies' is a function pointer that is called to perform the comparison, the pointer normally pointing to a function that just compares its arguments for equality and returns, and during the switching pointing to a function that performs the full comparison.

In a distributed system the old and the new copy of an object might reside in different computing nodes. Furthermore, some or all of the referring pointers might reside on different nodes, and mutators on several nodes in a distributed system might perform writes where the new value points to one of the objects being relocated.

The present method can be scaled to a distributed system (including one using distributed shared memory) as follows (other embodiments are also possible). The description of the adaptation to distributed system builds on the description of the overall garbage collection method disclosed in the U.S. patent application Ser. No. 13/090,643.

At 101, write propagation is enabled on all nodes in the distributed system (and each mutator on each node tracks writes where the value is one of the objects being relocated by any node).

In 102, soft synchronization 202 is performed on all nodes, and 206 waits for soft synchronization to complete on all nodes (actually, there could be an additional step that waits for all nodes to complete 206).

Writes in the taken write barrier buffers (or possibly just those whose memory locations contain pointers to the relocated objects) are logically combined (as if a union of the sets of locations was computed). In practice, they could be sent to a central node that combines them, or writes to each region could be sent to the region's home node, or writes whose written value refers to an object being relocated could be sent to the node responsible for relocating it. Memory locations found in remembered sets could be divided in a similar manner, or a central node could perform updates for locations in remembered sets.

If a central node is used to update locations in 103, the central node sends the update (address, old value, and new value) to all nodes having a replica of each updated memory location, and each such node performs the update using atomic compare-and-swap (or equivalent) if the location still contains the old value. To perform the updates, the central node should also be informed by nodes performing the actual copying of the new location of each object being relocated. Alternatively, it could send a query to the node responsible for copying each object about its new location as needed.

If locations are updated in a distributed fashion in 103, each node may update those locations whose value refers to that node (sending the update to all nodes that have a replica of the memory location). Since the node is responsible for updating locations that refer to objects relocated by it, it can quickly look up the new locations for them from using forwarding pointers it stores locally.

The forwarding pointers could be stored only locally by the node responsible for relocating an object. Storing them in an array or hash table associated with the region in which each object is stored could be advantageous here (to avoid having to send them to other nodes in a distributed system as might be the case if they were stored in distributed shared memory).

Updating thread-local values in 104 should be performed by (or on behalf of) all mutators on all nodes, waiting until the operation has completed on all nodes.

In a distributed environment, 702 and 802 could be performed in a variety of ways. In one embodiment they send a message to the node responsible for relocating the corresponding object, asking for the value of the forwarding pointer. That node then replies with a message including the value of the forwarding pointer (or the back pointer, as the case may be). The returned value may be cached (e.g., in a hash table), so that if the same value later needs to be mapped again, the value can be found locally. In another embodiment, the node collects a plurality of values that need to be mapped (e.g., by scanning locations that it is responsible for mapping), and sends a single request for a plurality of such locations, with the response containing the mappings for all of the requested locations. In yet another embodiment all nodes that relocate objects inform other nodes of the new locations of those objects, e.g., by sending the forwarding pointer tables for regions from which they are relocating objects to all nodes in the system (the tables could be compressed fairly effectively, and their total size is not excessive). Since copying and the construction of the tables advantageously takes place before updating referring pointers, they could be sent already before entering 101 (or, e.g., 103).

Messages in transit could be mapped to use only new copies by treating message construction as writes, mapping any pointers stored in new messages similarly to the way written values are mapped by the write barrier. As a message is received, any memory locations in it containing pointers could be treated as locations that need to be updated. Updating global memory locations could be changed to wait until all messages that were sent before mapping pointers stored in new messages was enabled. Alternatively, the data structures used for mapping values could be kept in memory until all messages that might contain references to the old copies of the objects being relocated have been processed. It would also be possible to perform the mapping for messages in message queues (i.e., after receiving them but before they have been handled by applications). The details of this depend on the particular embodiment.

It is also possible to achieve real-time operation in a distributed (or non-distributed) computer using the methods described herein. If the forwarding pointer tables are sent to all nodes before the referring pointer update begins, and every node updates every location of which it has a copy (i.e., replicas are updated by each node having a replica), there is probably nothing in the method that could not be made to operate in hard real-time (for mutators), with reasonable assumptions. If stack sizes are strictly limited to reasonably small sizes (as they usually are in real-time systems in practice), the entire update operation can be made to operate in deterministic hard real-time bounds for mutators. (As an alternative to limiting the sizes of stacks, any method of incrementally updating pointers in stack slots known in the art could be used.) This is without requiring the use of a read barrier. Basically the only operations that need to be analyzed for hard real-time requirements in mutators are the write barrier and the soft synchronization operations. Sufficient messaging bandwidth must however be available, and the garbage collector must be able to keep up with the allocation rate of the mutators (however, this has much more lax time constraints, as large nurseries could be used to run mutators for quite a while without having to block on the garbage collector).

A read barrier is a sequence of instructions (possibly comprising a fast path and a slow path), usually emitted by a compiler, used in mutators for reading the values of memory locations and performing various synchronization operations related thereto (for example, many concurrent garbage collectors use read barriers for synchronizing reads and writes during object relocation). Since reads are many times more frequent than writes in most applications, a read barrier incurs significant overhead on application execution, and it is therefore highly desirable to avoid read barriers.

Most concurrent object-relocating garbage collectors use read barriers. Because of the cost, many compilers use various tricks to reduce the fraction of reads that need to use a read barrier. However, known systems still insert a read barrier in a significant fraction of all reads. If the use of a read barrier could be avoided, on the average, in 80% or more of all reads from global memory locations (access to thread-local memory locations is usually performed without a read barrier anyway), the overhead of a read barrier would start to become insignificant. (Such an average could be computed as the average over the runtimes of a representative set of applications, such as those typically used for benchmarks in the ACM Memory Management conference papers.) Avoiding a read barrier entirely significantly loosens the coupling between mutators and the garbage collector, making it much easier to prove real-time properties and to implement real-time operation in a distributed system. It also allows the mutators and the garbage collector to be optimized more independently, enabling better optimization results for both.

Many variations of the above described embodiments will be available to one skilled in the art. In particular, some operations could be reordered, combined, or interleaved, or executed in parallel, and many of the data structures could be implemented differently. When one element, step, or object is specified, in many cases several elements, steps, or objects could equivalently occur. Steps in flowcharts could be implemented, e.g., as state machine states, logic circuits, or optics in hardware components, as instructions, subprograms, or processes executed by a processor, or a combination of these and other techniques.

It is to be understood that the aspects and embodiments of the invention described in this specification may be used in any combination with each other. Several of the aspects and embodiments may be combined together to form a further embodiment of the invention, and not all features, elements, or characteristics of an embodiment necessarily appear in other embodiments. A method, an apparatus, or a computer control logic which is an aspect of the invention may comprise any number of the embodiments or elements of the invention described in this specification. Separate references to "an embodiment" or "one embodiment" refer to particular embodiments or classes of embodiments (possibly different embodiments in each case), not necessarily all possible embodiments of the invention. The subject matter described herein is provided by way of illustration only and should not be construed as limiting.

A pointer should be interpreted to mean any reference to an object, such as a memory address, an index into an array of objects, a key into a (possibly weak) hash table containing objects, a global unique identifier, or some other object identifier that can be used to retrieve and/or gain access to the referenced object. In some embodiments pointers may also refer to fields of a larger object.

Achieving dynamic consistency means that the mutators see the memory on the system as behaving sanely: normal synchronization primitives appear to work, writes made by a mutator are not unduely missed, different copies of the same object are not distinguishable to the mutator application program (assuming proper implentation of pointer-equal comparisons), etc. In an embodiment of the present invention, dynamic consistency is achieved by using write barriers, re-copying, write monitoring, and/or write propagation in advantageous ways. In distributed systems, it is assumed (without limitation) that the consistency model dictates that writes only need to be visible on other nodes upon acquisition of applicable synchronization primitives, such as distributed mutual exclusion locks.

A write barrier may be implemented in various ways. It may be a fixed instruction sequence emitted by a compiler, it may be implemented as a function call, it may have a fast path and a slow path, it may be interleaved with other instructions by the compiler, it may be implemented using code specialization (e.g., implementing specialized versions of a function for different states relating to write barrier and/or read barrier), it may be implemented by a virtual machine interpreter or emulator, or a compiler may otherwise generate code that performs the functions of a write barrier. It may also be implemented fully or partially in logic in, e.g., a microchip, ASIC, or FPGA. All variants implementing functionality conventionally performed by a write barrier or described herein as being performed by a write barrier are to be considered a write barrier.

A computer may be any general or special purpose computer, workstation, server, laptop, handheld device, smartphone, wearable computer, embedded computer, a system of computers (e.g., a computer cluster, possibly comprising many racks of computing nodes), distributed computer, distributed system, computerized control system, processor, or other similar apparatus capable of performing data processing.

Apparatuses may be computers, but are not restricted to traditional computers. They may also be, for example, robots, vehicles, control systems, industrial machines, instruments, games, toys, or home or office appliances, and need not be confined to a single location.

Computer-readable media include, e.g., working memory of a computer (e.g., RAM), computer-readable magnetic data storage media (e.g., floppies, disk drives, tapes), computer-readable optical data storage media (e.g., disks, tapes, strips), semiconductor memories (such as flash memory and various ROM technologies), media accessible through an I/O interface in a computer, media accessible through a network interface in a computer, networked file servers from which at least some of the content can be accessed by another computer, data buffered, cached, or in transit through a computer network, or any other media that can be accessed by a computer. A computer control logic may be a computer program product on a tangible computer-readable media. Non-transitory computer-readable media include all computer-readable media except transitory signals.

What is claimed is:

1. A method comprising:
    relocating, by a garbage collector, a plurality of objects from one or more old copy memory areas to one or more new copy memory areas, the original objects in the old copy memory areas being called the old copies of the objects, and the new copies of the objects in the new copy memory areas being called the new copies;
    switching one or more mutators to use the new copies of the relocated objects concurrently with at least one mutator executing; and
    achieving dynamic consistency between the old copies and the new copies without activating a read barrier to synchronize activities of the garbage collector and activities of the one or more mutators;
    wherein the improvement comprises:
    copying, during the relocating, objects from the old copies to the new copies without verifying copying of each copied word.

2. The method of claim 1, wherein the improvement further comprises:
    the copying is performed without using atomic instructions.

3. The method of claim 1, wherein the improvement further comprises:
    monitoring, during the copying, writes by mutators to the old copies of the objects using one or more write barriers;
    during the monitoring, collecting information about which memory words in the old copies are written by the mutators during the copying in one or more thread-local data structures associated with one or more mutator threads;

obtaining the thread-local data structures from the one or more mutator threads; and re-copying, by the garbage collector, the written memory words.

4. The method of claim 3, wherein the improvement further comprises:

during the re-copying of at least one written memory word, propagating writes to the old objects to the new copies using one or more write barriers.

5. The method of 3, wherein:

the re-copying uses an atomic instruction to ensure that a propagated value is not overwritten by re-copying a previously written value.

6. The method of claim 1, wherein the improvement further comprises:

during the switching, propagating writes to the old objects to the new copies and writes to the new copies to the old copies using one or more write barriers.

7. The method of claim 1, wherein the old copies reside on more than one node in a distributed system.

8. The method of claim 1, wherein the old copy and the new copy of at least one of the objects reside on different nodes in a distributed system.

9. An apparatus comprising:

one or more processors; and a memory comprising instructions for causing the one or more processors to:

copy, without verifying copying of each copied word, a plurality of objects from one or more old copy memory areas to one or more new copy memory areas, the original objects in the old copy memory areas being called the old copies of the objects, and the new copies of the objects in the new copy memory areas being called the new copies;

achieve dynamic consistency between the old copies and the new copies without activating a read barrier to synchronize activities of a garbage collector and activities of one or more mutators; and switch one or more mutators to use the new copies concurrently with at least one mutator executing.

10. The apparatus of claim 9, wherein the copying is configured to be performed without using atomic memory operations.

11. The apparatus of claim 9, wherein:

a write barrier is further configured to monitor writes to the old copies and record information about which memory words in old copies have been written in one or more thread-local data structures associated with one or more mutator threads; and the garbage collector is further configured to obtain the thread-local data structures from the one or more mutator threads, and re-copy the written memory words.

12. The apparatus of claim 9, wherein the old copy and the new copy of at least one of the objects object reside on different nodes of a distributed system.

13. A computer control logic stored on non-transitory computer-readable medium operable to cause one or more processors to:

relocate a plurality of objects from one or more old copy memory areas to one or more new copy memory areas, the original objects in the old copy memory areas being called the old copies of the objects, and the new copies of the objects in the new copy memory areas being called the new copies;

switch one or more mutators to use the new copies of the relocated objects concurrently with at least one mutator executing; and achieve dynamic consistency between the old copies and the new copies without activating a read barrier to synchronize activities of the garbage collector and activities of the one or more mutators;

wherein the improvement comprises:

copying, during the relocating, objects from the old copies to the new copies without verifying copying of each copied word.

14. The computer control logic of claim 13, wherein the copying is performed without using atomic instructions.

15. The computer control logic of claim 13, wherein the improvement further comprises the computer control logic being operable to:

monitor, during the copying, writes by mutators to the old copies of the objects using one or more write barriers;

during the monitoring, collect information about which memory words in the old copies are written by the mutators during the copying in one or more thread-local data structures associated with one or more mutator threads;

obtain the thread-local data structures from the one or more mutator threads; and re-copy the written memory words.

16. The computer control logic of claim 13, wherein the old copy and the new copy of at least one of the objects reside on different nodes in a distributed system.

* * * * *